United States Patent
Kabalnov et al.

(10) Patent No.: US 9,080,072 B2
(45) Date of Patent: Jul. 14, 2015

(54) WHITE INK-JET INKS

(75) Inventors: Alexey S. Kabalnov, San Diego, CA (US); Vladek Kasperchik, Corvallis, OR (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 14/124,641

(22) PCT Filed: Jun. 10, 2011

(86) PCT No.: PCT/US2011/039917
§ 371 (c)(1),
(2), (4) Date: Dec. 6, 2013

(87) PCT Pub. No.: WO2012/170032
PCT Pub. Date: Dec. 13, 2012

(65) Prior Publication Data
US 2014/0123874 A1      May 8, 2014

(51) Int. Cl.
*C09D 11/02* (2014.01)
*C09D 11/38* (2014.01)
*C09D 11/322* (2014.01)

(52) U.S. Cl.
CPC ............... *C09D 11/38* (2013.01); *C09D 11/322* (2013.01)

(58) Field of Classification Search
USPC ....................................................... 106/31.65
See application file for complete search history.

(56) References Cited

U.S. PATENT DOCUMENTS

| | | |
|---|---|---|
| 6,312,510 B1 | 11/2001 | Kamagata et al. |
| 7,850,774 B2 | 12/2010 | Oriakhi |
| 2004/0037947 A1 | 2/2004 | Patel et al. |
| 2004/0139889 A1* | 7/2004 | Zimmermann et al. ...... 106/415 |
| 2005/0113485 A1 | 5/2005 | Yokoi |
| 2006/0155005 A1 | 7/2006 | Kondo et al. |
| 2008/0194754 A1 | 8/2008 | Nakamura et al. |
| 2010/0143593 A1 | 6/2010 | Sano |
| 2010/0174009 A1 | 7/2010 | Tucker et al. |
| 2011/0262724 A1* | 10/2011 | Okuda et al. ................. 428/207 |

FOREIGN PATENT DOCUMENTS

| | | |
|---|---|---|
| CN | 1247557 | 3/2000 |
| CN | 1721483 | 1/2006 |
| EP | 0960916 | 12/1999 |
| EP | 1609825 | 12/2005 |
| EP | 2154210 A2 | 2/2010 |
| EP | 2243807 A1 | 10/2010 |
| JP | 2009-536247 A | 10/2009 |
| JP | 2010174100 | 8/2010 |

OTHER PUBLICATIONS

International Searching Authority, The International Search Report and the Written Opinion, Feb. 24, 2012, 9 Pages, App No. PCT/US2011/039917 Pri App to U.S. Appl. No. 14/124,641.

* cited by examiner

*Primary Examiner* — Veronica F Faison
(74) *Attorney, Agent, or Firm* — Van Cott, Bagley, Cornwall & McCarthy

(57) ABSTRACT

A white ink jet ink includes high index of refraction particles having an index of refraction greater than 1.6 and a diameter of less than 100 nanometers and low index of refraction particles having an index of refraction of less than 1.5 and a diameter of between 100 and 1000 nanometers.

15 Claims, 4 Drawing Sheets

WHITE INK-JET INKS

BACKGROUND

White inks used in a variety of applications such as labeling and marking, visual arts, priming, undercoating, etc. One of the uses for white inks is to provide a good hiding power, that is, to be able to effectively mask the underlying color. The masking of the underlying color or image renders the underlying color less visually perceptible. The area can be left white or can be printed over with second color.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
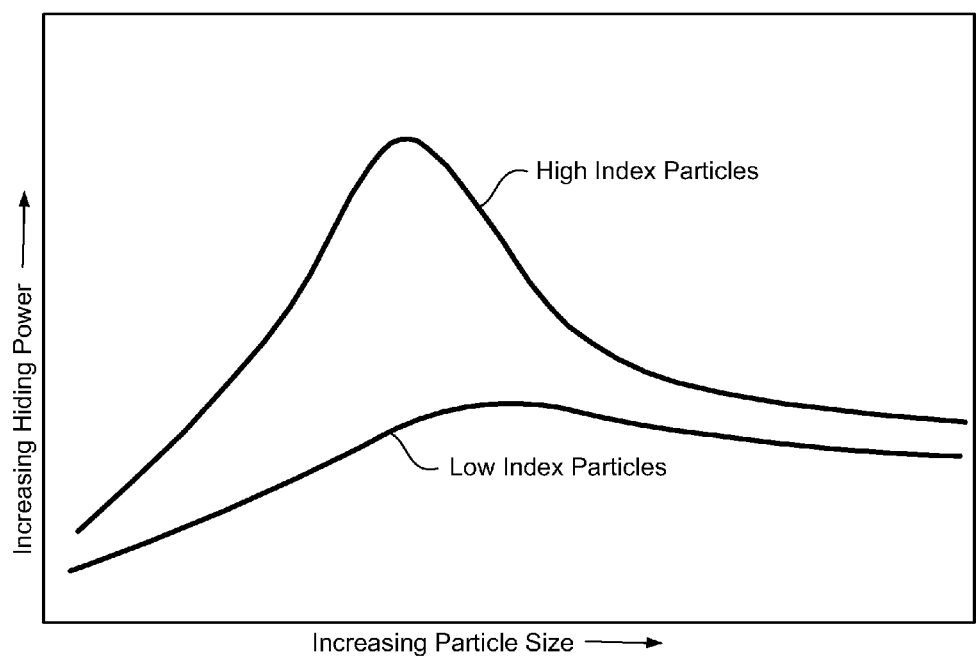
FIG. 1 is a graph showing the relationship between particle size of a pigment and the pigment's hiding power, according to one example of principles described herein.

White inks function accepting incident light and scattering it back to an observer. The more efficiently the incident light is scattered and returned to the observer, the better the white ink is in covering underlying colors and images. Developing white inks for thermal ink-jet printing systems is challenging. Thermal Ink-jet inks typically have a low viscosity (on the order of ~1-10 cPoise for a typical for a formulation), and a low percentage of pigment (on the order of 1%-10% for a typical formulation). This results in a relatively low concentration of pigments on the substrate. For a white ink-jet ink to have good hiding power, it can be desirable to use particles with a high-refractive index and optimized sizes that results in a high scattering intensity. Light-scattering power of transparent particles in dispersion is also highly dependent on particle size. Maximum light-scattering is observed at particle size in a range of 200-250 nanometers. Below 200 nm, the scattering power of transparent particles begins to decay and drops especially dramatically at particle size below the 100 nm range.

Another characteristic of pigments with high scattering intensity is a high refractive index. However, most high refractive index particles, such as metal oxide particles, are relatively dense, and, at optimal particle sizes, cannot be stably dispersed in the carrier fluid of the ink-jet system. For example, titania has very high-refractive index (2.4-2.7). However, titania has a bulk material density of ~4.2 grams per cubic centimeter and an optimal particle size of titania has a diameter of approximately 200-500 nm. This high density and relatively large sizes can lead to the dense titania particles settling out of the carrier liquid. When the pigment particles settle out of the liquid, the ink-jet mechanisms can become obstructed and the quality of the ink dispensed can be compromised.

Thus, practically all material with a high refractive index and optimal particle size may settle out of the ink-jet in a matter of days if not hours. A variety of approaches could be used to improve settling performance. For example, the particle size could be reduced to less than 50 nm. At such a small particle size, settling becomes less significant even for particles with a very large density such as titania, because of the Brownian motion/diffusion. However, the scattering intensity/hiding power also go down quite drastically because of the reduced diameter of the particles.

Other potential solutions could be used to address the challenge of creating a white ink-jet ink with high hiding power while maintaining the stability of pigment particles in the ink carrier. A mechanical solution is to constantly re-circulate the white ink to keep the heavy/large pigment particles in suspension. This solution adds the hardware cost to the system and requires the system to be constantly powered-up. Another solution is to use a viscoelastic shear-thinning ink vehicle that prevents settling but is still ink-jettable. This approach as a number of advantages but may generate decap/nozzle start-up issues and/or prevent jetting of the ink from nozzles if the viscosity is high enough. An alternative approach is to use porous particles such as hollow sphere latex particles. These hollow sphere latex particles allow for a minimum density differential, but to maximize the hiding power of the ink requires high content of the scattering hollow latex particles. As discussed above, ink-jet ink formulations typically limit the amount of particles in the ink-jet solution (generally 4-6 wt %). At higher percentages, the reliability of the ink-jet can go down significantly due to nozzle clogging, cogation etc.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

In white inks, the "colorant" is essentially colorless and can be formed as dispersion of optically translucent crystals in a solvent. The hiding power of the inks is therefore dependent primarily on the ability of these particles to scatter light. The scattering intensity of the light is known to be a strong function of the refractive index difference between the particles and the material surrounding the particles, and the particle size. As far as the refractive index is concerned, the larger is the difference between the particles and the surrounding material, the larger is scattering effect. Because of this, the highest hiding power is shown by the particles of materials with a high refractive index, such as titania, zirconia, aluminum phosphate, alumina, calcium carbonate, and similar materials. For example, appropriately selected materials with a refractive index in the range of n=1.6-2.9 may be effective as pigments in white ink.

TABLE 1

High-refractive index white pigments

| Compound | Refractive index | Density, g/cm3 | Settling time, 10 cm path in water, d = 250 nm, Stokes law, days |
|---|---|---|---|
| TiO2, rutile | 2.903 | 4.5845 | 9 |
| TiO2, Anatase | 2.49 | 3.7842 | 12 |
| Al2O3 Corundum | 1.77 | 3.95-4.0 | 12 |
| CaCO3 Calcite | 1.65 | 2.71 | 20 |

In determining the difference in index of refraction between these pigments and the materials that surround the pigments, the ink carrier medium should not be considered, but the material that surrounds the particles on a media after the inks dry. It can be, for example, the polymeric binder present in the ink, the residual non-volatile solvents and surfactants, or/and air. For those components, a material with a low refractive index of 1-1.5 can be selected maximize scattering and minimize the optical matching effect. The refractive index and density of a number of polymer latexes and oil emulsions are given in Table 2.

TABLE 2

Polymer latexes and oil emulsions

| Compound | Refractive index | Density, g/cm3 |
|---|---|---|
| Styrene-Acrylic latexes | 1.3-1.5 | 0.95-1.05 |
| Polytetrafluoroethylene (Teflon); other fluoropolymers | 1.3 | 2-2.8 |
| Hydrocarbons | 1.3-1.4 | 0.7-0.9 |
| Fluorocarbons | 1.2-1.3 | 1.7-2.1 |
| Silicone oil | 1.3 | 0.76 |

As discussed above, the particle size also influences the hiding power of the ink. FIG. 1 is an illustrative graph of the hiding power of translucent particles as a function of size. The vertical axis represents hiding power, with low hiding powers being located near the bottom of the graph and higher hiding powers being located higher on the graph. The horizontal axis represents particle size, with smaller particle sizes being located to the right and higher particles sizes to the right. For particle sizes much smaller than the wavelength of the light, the scattering intensity strongly increases with the size, reaching a maximum where the diameter of the particle is approximately the wavelength of the visible light. For larger particle sizes, the hiding power shows some decrease.

As discussed above, it can be challenging to develop a white ink-jet ink with high hiding power. The characteristics of thermal ink-jet droplet generators place limits on both the viscosity of the ink and the percentage of pigments that can be included in the ink. The particle types and sizes that would be most effective in producing a high hiding power are large and dense, and consequently, are not stable in the low viscosity ink. Attempting to reduce the size of the high density particles improves the stability of the particles in the ink but dramatically reduces the hiding power of the pigments.

According to one implementation of the principles described herein, small size high refractive index particles may be mixed with large low-refractive index particles. As the ink dries on the substrate, the high refractive particles become entrapped (or form a continuous phase) between the large low-refractive index particles. This creates the optical non-uniformity in optical index of refraction that is essentially equivalent in scattering power to a system with large refractive particles surrounded by the low refractive index medium. This ink can exhibit an extended shelf life because the density of large, low-refractive index particles can be more readily matched to that of the dispersion medium of the ink. This low difference in density between the large, low-refractive index particles and the dispersion medium allows the large particles to remain suspended in the dispersion medium for long periods of time. For example, the large, low refractive index particles can be formed from polymeric latexes or emulsions of hydrocarbons or fluorocarbons with the particle size of 100-1000 nm. These materials have a low refractive index, and as a rule, much lower density, within the range of 0.7-2.1 g/cm3, which is much closer to the density of the typical ink vehicles such as water. To more closely approximate the density of a water based ink vehicle, mixtures of hydrocarbon and fluorocarbon oils could be used to form the large particles. In one implementation, the large particles can be microscopic air bubbles, created, for example, by evaporation of emulsion particles formed by a volatile oil.

The small, highly refractive particles can be formed from very dense, high refractive index materials such as 20-50 nm particles of titania, alumina, silica or calcium carbonate. The particles can be made as small as practically possible because they do not serve as primary scatterers. To achieve the desired size and size distribution of the particles, the high refractive index particles can be precision milled. As discussed above, these small particles can remain stably in suspension for extended periods of time due to Brownian motion.

As the ink is deposited on the target substrate, it is desirable for the large and small particles to be intermixed so that the large particles are surrounded by the smaller particles. This can be readily accomplished on substrates that tend to immobilize the particles at the surface, such as porous photo media or non penetrant substrates such as vinyl and aluminum foil. For substrates that do not enable such immobilization, such as plain paper, special mechanisms such as pre-treatment of the media with a fixing agent could be implemented to facilitate such immobilization. This pretreatment can mitigate the tendency of the smaller particles to be carried away from the large particles into the interior of the substrate.

Figure 2A:
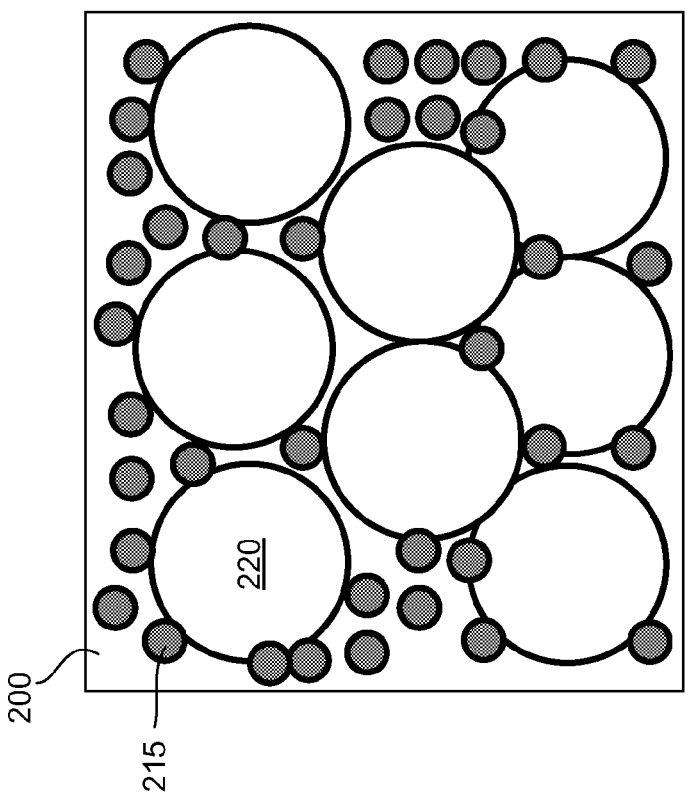
FIG. 2A is a diagram of a white ink layer disposed on a substrate that includes large high index of refraction particles surrounded by small low index of refraction particles, according to one example of principles described herein.

FIG. 2A illustrates dried white ink (205, 210) on a substrate (200). The dried white ink is made up of large high density, high index of refraction particles (210) surrounded by small low index of refraction particles (205). The difference in index of refraction between the large particles (210) and the small particles (205) influences the hiding power of the white ink. The higher the difference in the index of refraction, the greater the scattering and hiding effect of the high index of refraction particles. However, as discussed above, this particular ink composition may not be suitable for ink-jet inks because the large, dense particles (210) may not exhibit the desired stability in the carrier fluid.

Figure 2B:
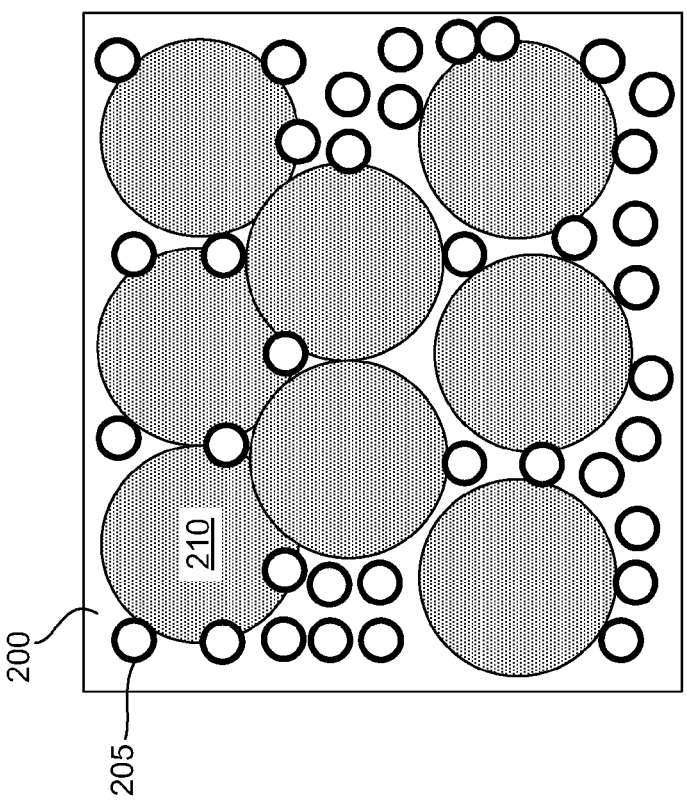
FIG. 2B is a diagram of a white ink layer disposed on a substrate that includes large low index of refraction particles surrounded by small high index of refraction particles, according to one example of principles described herein.

FIG. 2B shows an illustrative dried white ink (215, 220) on a substrate (200). The dried white ink is made up of large, low density, low index of refraction particles (220) surrounded by high index of refraction smaller particles (215). As discussed above, the large, low density, low index of refraction particles (220) may be polymer latex particles or an emulsion. The high index of refraction particles (215) may be made up of higher density materials. The optical characteristics of this white ink layer (215, 220) can be theoretically identical and practically similar to dried ink shown in FIG. 2A. Specifically, the hiding power is influenced by the difference between the index of refraction of the large particles and the surrounding small particles. Because the difference in index of refraction is large, the hiding power of the white ink is significant for both the white ink layer shown in FIG. 2A and for the white ink layer shown in FIG. 2B. However, the ink illustrated in FIG. 2B can be substantially more stable than the ink shown in FIG. 2A. This is because the large particles (220) have been formed from low density materials that are closer to the density of the ink vehicle. Consequently, gravitational forces do not tend to pull larger particles (220) out of suspension.

Small High Index Particles

The small, high index of refraction particles (215) can be formed from a variety of materials and using a number of processes. Three illustrative examples of material and processes for forming the small high index particles are given below.

Example 1

The starting material was $TiO_2$ (rutile) (Ti-Pure® R-931 from DuPont). Non-milled material in water had particle size in 2-5 μm range. The $TiO_2$ powder was milled in aqueous dispersion (50 wt % load). Silquest A-1230 from "Momentive Performance Materials" was used as dispersant. The dispersant/pigment ratio during milling was 0.5. The milling equipment used was Ultra Apex Mill UAM-015 from Kotobuki Industries Co., Ltd. loaded with 50 μm Yttrium stabilized Zirconia (YTZ) beads. After eight hours of milling the volume-weighted particle diameter (Mv) of $TiO_2$ was reduced down to 33 nm. These titanium oxide particles were dispersed in an aqueous solution so that the content of the $TiO_2$ was equal to 11% by weight of the solution. The dispersion didn't show any significant settling during 6 months of shelf-storage.

Example 2

The starting material was $TiO_2$ (AEROXIDE® P 25 from Evonik Industries). The $TiO_2$ powder was milled in aqueous dispersion (50 wt % load). Silquest A-1230 from "Momentive Performance Materials" was used as dispersant. The dispersant/pigment ratio during milling was 0.5. The milling equipment used was Ultra Apex Mill UAM-015 from Kotobuki Industries Co., Ltd. loaded with 50 μm YTZ beads. After three hours of milling the volume-weighted particle diameter (Mv) of $TiO_2$ was reduced down to 39 nm. The content of the $TiO_2$ in the finished dispersion was equal to 12 wt %. The dispersion didn't show any significant settling during 5 months of shelf-storage.

Example 3

The starting material was $TiO_2$ (MT-100HD from Tayca Corporation). The $TiO_2$ powder was milled in an aqueous dispersion (50 wt % load). Silquest A-1230 from "Momentive Performance Materials" was again used as dispersant. The dispersant/pigment ratio during milling was 0.5. The milling equipment used was Ultra Apex Mill UAM-015 from Kotobuki Industries Co., Ltd. loaded with 50 μm YTZ beads. After 5 hours of milling the volume-weighted particle diameter (Mv) of $TiO_2$ was reduced down to 25 nm. Content of the $TiO_2$ in the finished dispersion was equal to 11.6 wt %. The dispersion didn't show any significant settling during 8 months of shelf-storage.

Polymer Latex and Emulsions

The fluorocarbon and hydrocarbon emulsions can be prepared in a variety of ways. For example, 0.3 g of Zonly FSO surfactant (DuPont) was dissolved in 10 g of water and 4 g of peflurohexane (Aldrich) was added. The composition was immediately sonicated for four minutes using a 50% duty cycle with a two second cycle duration. The sample was sonicated in an ice bath.

Formulations of White Inks

The components that are used in the ink are shown in Table 3. Each ink composition included titanium oxide particles and one latex/emulsion selected from Table 3.

TABLE 3

Properties of the dispersion components used for making white inks

| System | Chemical composition | Amount of solids, wt % | Average Particle diameter, Dw, nm |
|---|---|---|---|
| $TiO_2$ VK 91609 | Chemically modified, milled $TiO_2$ | 11 | 33 |
| 778MI | Acrylic latex | 44.8 | 306 |
| Reycryl 48083 | Acrylic latex | 30 | 194 |
| Acryljet 2500 | Acrylic latex | 30.9 | 246 |
| TE-3887-N | Teflon emulsion | 56.25 | 206 |
| PFH emulsion | Emulsion of perfluorohexane in water stabilized by Zonyl FSO | 28 | 541 |

To make the white inks, one gram of titania dispersion was mixed with 0.1 to 1 grams of emulsion/polymeric latex under gentle mixing. The formula of the various inks is given below in Table 4.

TABLE 4

Ink Formulae

| ink# | latex/emulsion | wt % latex/emulsion | wt % $TiO_2$ | wt % Zonyl | water |
|---|---|---|---|---|---|
| 22 | perfluorohexane | 5.6 | 8.8 | 0.4 | balance |
| 24 | perfluorohexane | 4.7 | 9.2 | 0.3 | balance |
| 25 | perfluorohexane | 6.5 | 8.5 | 0.5 | balance |
| 26 | perfluorohexane | 8 | 7.9 | 0.6 | balance |
| 27 | perfluorohexane | 9.3 | 7.3 | 0.7 | balance |
| 28 | perfluorohexane | 14 | 5.5 | 1 | balance |
| 9 | Teflon TE-3887N | 5.1 | 10 | none added | balance |
| 9a | Teflon TE-3887N | 2.7 | 10.5 | none added | balance |
| 10 | Teflon TE-3887N | 9.4 | 9.2 | none added | balance |
| 11 | Teflon TE-3887N | 13 | 8.5 | none added | balance |
| 12 | 48083 latex | 2.7 | 10 | none added | balance |
| 13 | 48083 latex | 5 | 9.2 | none added | balance |
| 14 | 48083 latex | 6.9 | 8.5 | none added | balance |
| 6 | Acryljet 2500 | 2.8 | 10 | none added | balance |
| 6a | Acryljet 2500 | 1.5 | 10.5 | none added | balance |
| 7 | Acryljet 2500 | 5.2 | 9.2 | none added | balance |
| 19 | Acryljet 2500 | 7.2 | 8.5 | none added | balance |
| 16 | 778 MI latex | 4.1 | 10 | none added | balance |
| 17 | 778 MI latex | 7.5 | 9.2 | none added | balance |
| 18 | 778 MI latex | 10.3 | 8.5 | none added | balance |

As can be seen from the tables and information above, the white ink-jet ink includes high index of refraction particles having an index of refraction greater than 1.6 and a diameter of less than 50 nanometers and low index of refraction particles having an index of refraction of less than 1.5 and a diameter of between 100 and 1000 nanometers. Given that the wavelengths of light in the visible spectrum range from 380 to 750 nanometers, it can be seen that the large low index of refraction particles having an average diameter that is approximately a wavelength of visible light while the small high index of refraction particles having an average diameter that is approximately one tenth of a wavelength of visible light.

The high index particles may be formed from a variety of materials including titania, alumina, silica, calcium carbonate or other appropriate materials that have an index of refraction between 1.6 and 2.9. The low index of refraction particles may be formed as an emulsion in the aqueous carrier fluid that includes at least 50% water. These low index of refraction particles may have an index of refraction of less than 1.4. For example, the high index of refraction particles may be rutile titania with an index of refraction of 2.9 and an emulsion of perfluorohexane with an index of refraction of approximately 1.3. The difference in index of refraction between the two particles is approximately 1.6. Generally, the two materials can be selected so that the difference in their indices of refraction is at least 1.4. The emulsion of low index material comprises between 4-15% by weight of the total ink and the high index of refraction particles comprise between 7-11% by weight of total ink.

Testing

The hiding power of the various white ink-jet ink compositions were tested on a black photo media and aluminum foil. For preparation of the black porous photo media, 100% black areas were printed using HP PCS 2210 printer in photo mode, using HP Advanced Photo semigloss media and the prints were allowed to dry for one day. The optical density of the black area was OD=2.00. Commercial aluminum foil was used without modification. The optical density of foil was measured as OD=0.7.

For the characterization of the hiding power of the white inks, draw-downs were made onto both the black photo media and the aluminum foil with #6 Mylar rod (Gardco), that produces 15.2 um-thick film. After coating, the media was immediately dried by a heat gun. No coating defects were observed on photo media, while some de-wetting was seen on aluminum foil, in particular, for Zonyl FSO-free systems.

Figure 3:
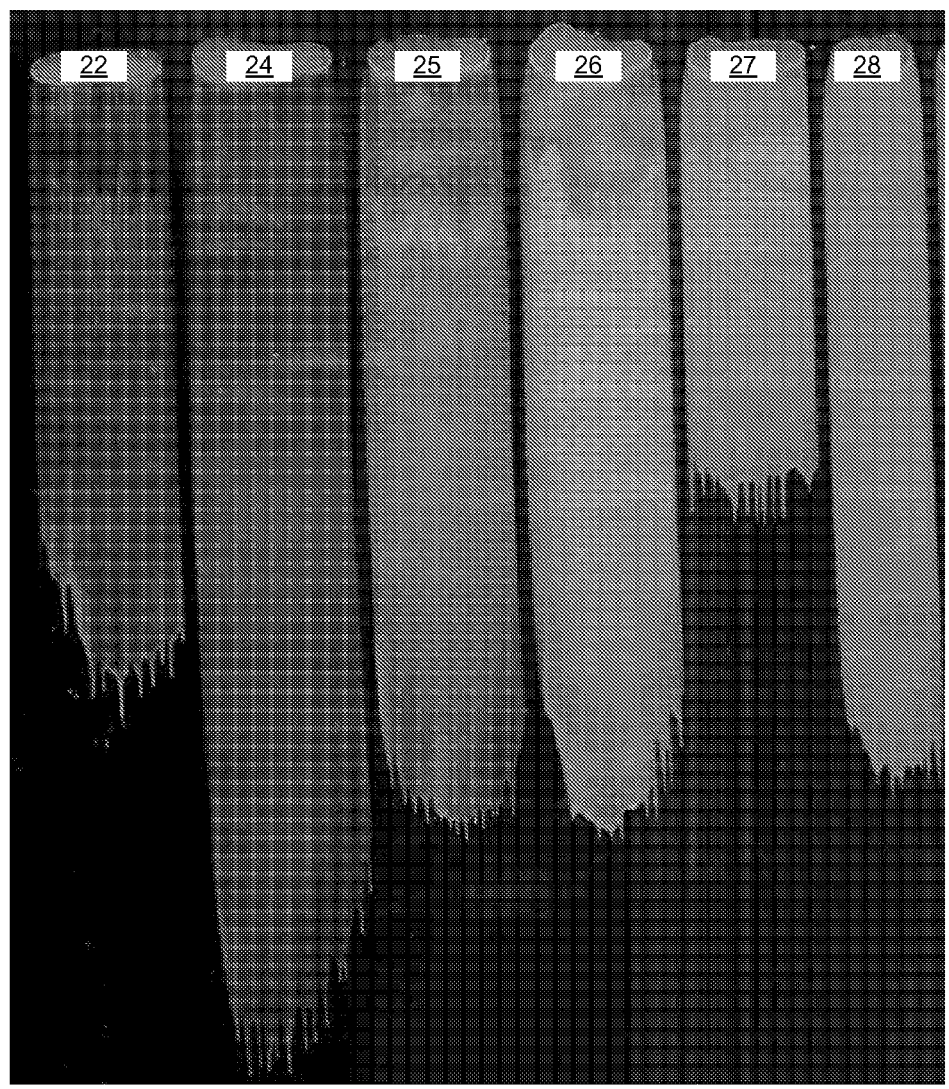
FIG. 3 a photograph of a test of hiding power of various white ink-jet inks disposed on black photo media, according to one example of principles described herein.

FIG. 3 shows illustrative stripes of white ink compositions 22 and 25-28 deposited on the black porous photo media using rod drawdowns. After drying the white ink, the optical density of each stripe was measured in three different locations and the result was averaged. As can be seen from the image, the stripes on the left show less hiding power than the stripes on the right. The hiding power of the white ink is shown in Table 5 below. The first column of Table 5 shows the ink number or control composition. The ink formulae corresponding to the ink numbers are given above in Table 4.

To characterize the hiding power of the various white inks, an optical density change (delta OD) was calculated by subtracting the measured optical density of the white ink and subtracting the optical density of the background. Overall, about one unit of optical density decrease is seen on photo media, and about 0.2-0.3 optical density units on aluminum foil.

Table 5 and other results show that the combination of $TiO_2$ and emulsion polymer had the greatest hiding power. For example, the first line of Table 5 shows that the application of a solution with the same concentration of $TiO_2$ but without latex resulted in no change in optical density when compared to the background. The solution of $TiO_2$ produced a highly transparent film over the background. As shown in the second line of the chart, the latex emulsion by itself resulted in no change in the optical density. Similarly, three out of four latex-only control formulations formed transparent films after drying and exhibited no hiding power. In contrast, ink formulae that had the highest hiding power included a combination of small high index of refraction particles ($TiO_2$) and larger low index of refraction latex particles. For example, ink formula #27 included 9.3 wt % of perfluorohexane emulsion, 7.3 wt % of TiO2, and 0.7 wt % Zonyl. Ink formula #27 exhibited a change in optical density of 1.2 optical density units and superior hiding power.

TABLE 5

Optical masking effect on black photo media

| Ink # | delta OD | latex/emulsion |
|---|---|---|
| $TiO_2$ only control | 0 | n/a |
| Emulsion only control | 0 | perfluorohexane |
| 22 | 0.62 | perfluorohexane |
| 24 | 0.68 | perfluorohexane |
| 25 | 0.93 | perfluorohexane |
| 26 | 1.16 | perfluorohexane |
| 27 | 1.2 | perfluorohexane |
| 28 | 1.12 | perfluorohexane |
| Latex-only control | 0.3 | Teflon TE-3887N |
| 9 | 0.95 | Teflon TE-3887N |
| 9a | 0.64 | Teflon TE-3887N |
| 10 | 0.83 | Teflon TE-3887N |
| 11 | 0.83 | Teflon TE-3887N |
| Latex-only control | 0 | 48083 latex |
| 12 | 0.62 | 48083 latex |
| 13 | 0.67 | 48083 latex |
| 14 | 0.73 | 48083 latex |
| Latex-only control | 0 | Acryljet 2500 |
| 6 | 0.58 | Acryljet 2500 |
| 6a | 0.5 | Acryljet 2500 |
| 7 | 0.77 | Acryljet 2500 |
| 19 | 0.7 | Acryljet 2500 |
| Latex-only control | 0 | 778 MI |
| 16 | 0.57 | 778 MI |
| 17 | 0.52 | 779 MI |
| 18 | 0.67 | 780 MI |

Table 6 shows the optical masking effect of the white inks on aluminum foil. As noted above, some de-wetting was seen on aluminum foil, in particular, for Zonyl FSO-free systems. The latex, emulsion, and $TiO_2$ control inks showed minimal changes in optical density. The most effective white ink formula was ink #27 that showed change in optical density change of 0.38.

TABLE 6

Optical masking effect on aluminum foil

| Ink# | delta OD |
|---|---|
| 23 | 0.13 |
| 26 | 0.34 |
| 25 | 0.36 |
| 24 | 0.26 |
| 22 | 0.30 |
| 27 | 0.38 |
| 28 | 0.35 |
| 9a | 0.23 |
| 9 | 0.13 |
| 10 | 0.10 |
| 11 | 0.17 |
| latex only | 0.1 |
| emulsion only | 0.0 |
| $TiO_2$ only | 0.0 |

Figure 4:
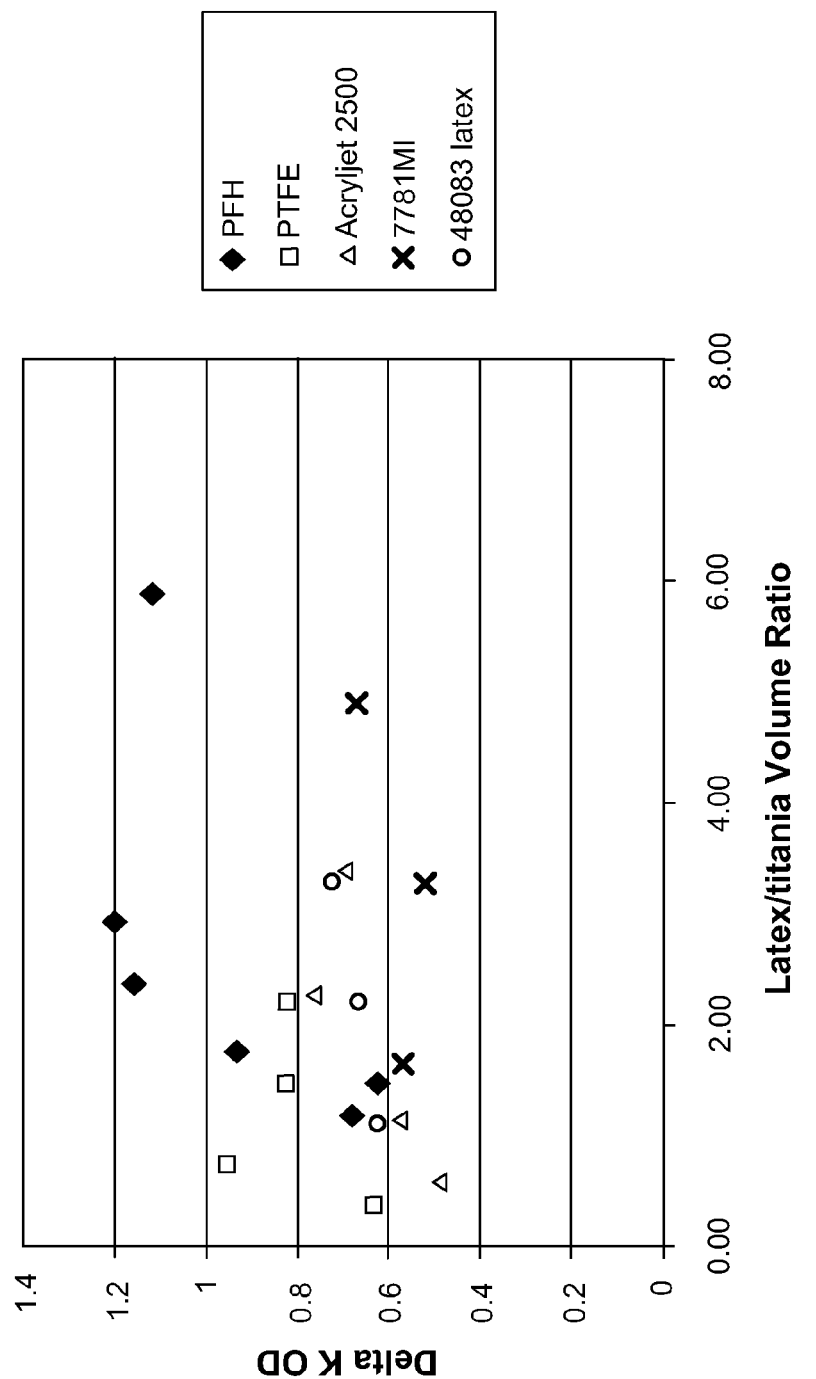
FIG. 4 is a graph of the change in optical density resulting from the deposition of white ink-jet inks on black photo media, according to one example of principles described herein.

FIG. 4 shows the change in optical density on the black photo media plotted against the approximate ratio of the latex to titania in the system, by volume. The vertical axis of the graph shows the change in optical density. The black photo media had an initial optical density of approximately 2.00. The deposition of white ink-jet ink on the black photo media reduces the optical density of the surface. The difference between the initial optical density and the optical density after deposition of the white ink-jet ink is shown as "Delta K OD" on the vertical axis.

The latex/titania volume ratio is shown along the horizontal graph of the chart. The latex/titania volume ratio is only approximate due to estimates of the densities of the polymers/latex.

As shown in the graph, white ink compositions that include perfluorohexane (PFH) particles tend to have high hiding power. The PFH containing inks showed a strong relationship between changes in optical density and the latex/titania volume ratio. For example, white inks containing PFH/titania volume ratios between about 1 and 2 exhibited Delta K OD values of less than one while volume ratios of between about 3 and 6 exhibited Delta K OD values of greater than one. Note that perfluorohexane has a boiling point of 56 C and is substantially evaporated from the white ink when it is deposited on the media. This leaves pores in the white ink which are filled with air. The white compositions that tended to have less hiding power included inks with 788MI polymer.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A white inkjet ink comprising;
   high index of refraction particles having an index of refraction of greater than or equal to 1.6 and a diameter of less than 50 nanometers; and
   low index of refraction particles having an index of refraction of less than or equal to 1.5 and a diameter of between 100 and 1000 nanometers;
   wherein the low index of refraction particles comprise perfluorocarbon.

2. The ink of claim 1, in which the high index of refraction particles have an average diameter of between approximately 10-50 nanometers.

3. The ink of claim 1, in which the low index of refraction particles comprise an emulsion in a carrier fluid.

4. The ink of claim 1, in which a difference between the indices of refraction in the high index of refraction particles and in the low index of refraction particles is at least 0.1.

5. The ink of claim 1, in which the high index of refraction particles comprise at least one of: titania, zirconia, zinc oxide, aluminum phosphate alumina, silica and calcium carbonate.

6. The ink of claim 5, which the high index of refraction particles comprise rutile titania.

7. The ink of claim 1, in which the high index of refraction particles are selected from materials with an index of refraction of between 1.6 and 2.9.

8. The ink of claim 1, in which the lower index of refraction particles have an index of refraction of less than 1.4.

9. The ink of claim 1, in which a difference between an index of refraction of the high index particles and an index of refraction of the low index particles is at least 1.4.

10. A jettable white ink comprising:
    a water based carrier fluid;
    a first pigment having a diameter less than 100 nanometers and an index of refraction of at least 1.6, the first pigment comprising between 7-11% by weight of the total ink; and
    a second component having a diameter of at least 100 nanometers and an index of refraction of less than or equal to 1.5, the second component comprising between 4-15% by weight of the total ink, in which the second component comprises an emulsion of perfluorocarbon in the water based carrier fluid.

11. The ink of claim 10, in which the first pigment comprises rutile titania particles and the second component comprises perfluorohexane.

12. The ink of claim 10, in which the first pigment has a density of at least 2.5 grams per cubic centimeter, the first pigment being dispersed in the carrier fluid and exhibiting a shelf life of at least 5 months.

13. A dried white ink layer comprising:
    large low index of refraction particles comprising perfluorocarbon and having an average diameter which is approximately a wavelength of visible light and an index of refraction which is less than or equal to 1.5; and
    small high index of refraction particles having an average diameter which is approximately one tenth of a wavelength of visible light and an index of refraction which is greater than or equal to 1.6.

14. The ink layer of claim 13, in which the small high index of refraction particles and the large low index of refraction particles are intermingled in the dried white ink layer such that the small high index of refraction particles surround the large low index of refraction particles.

15. The ink of claim 1, in which the perfluorocarbon is perfluorohexane.

* * * * *